Sept. 11, 1956 G. SINCLAIR 2,762,653
AGITATING AND SPRAY DEVICE
Filed Aug. 25, 1955 2 Sheets-Sheet 1
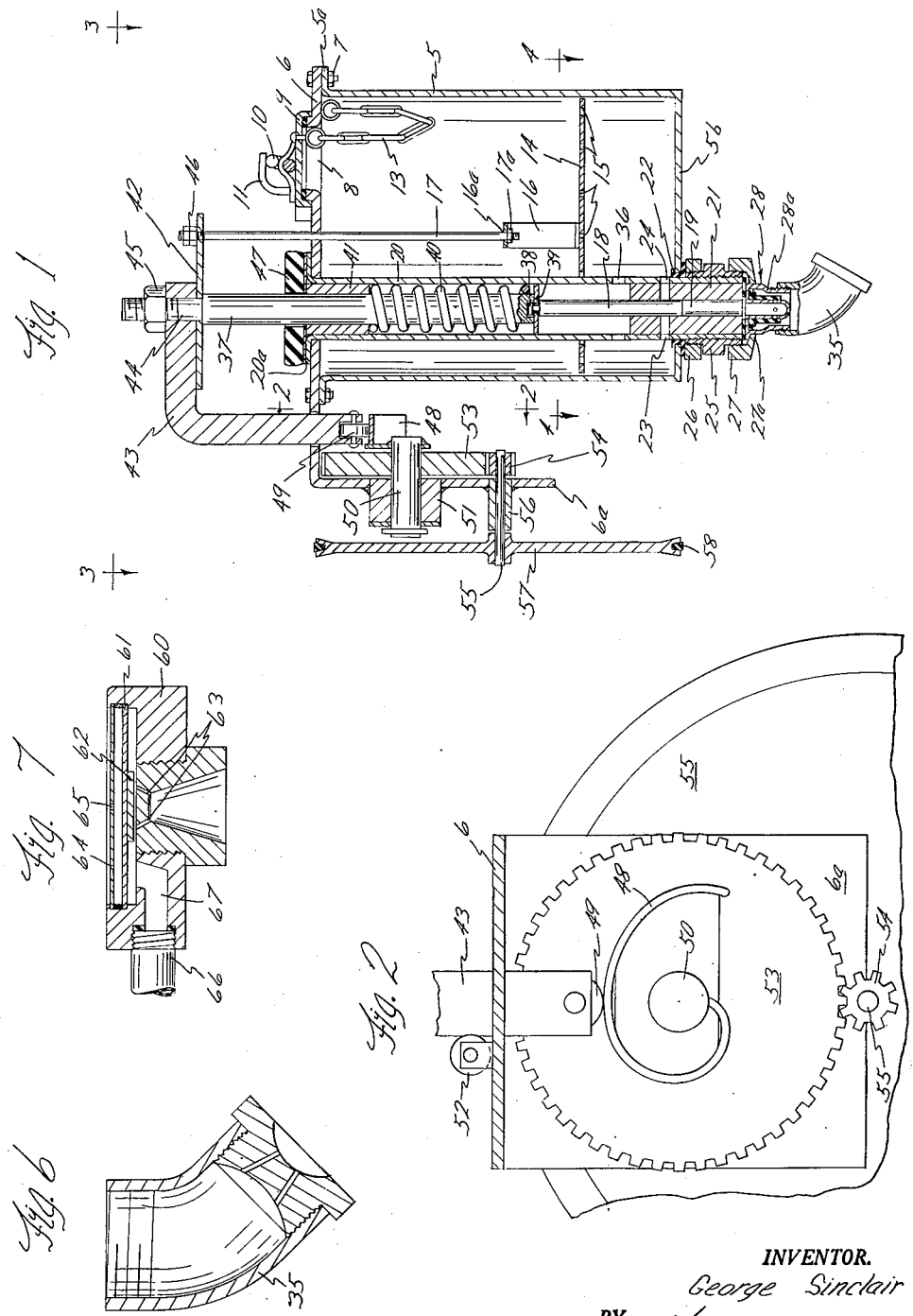
INVENTOR.
George Sinclair
BY
Atty.

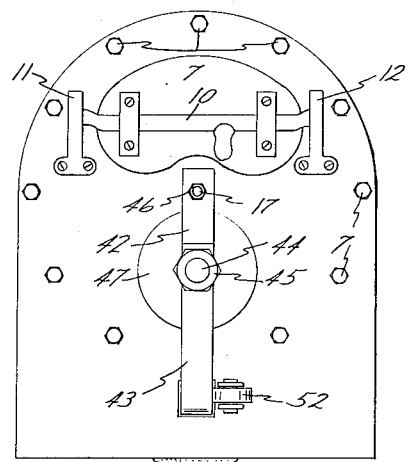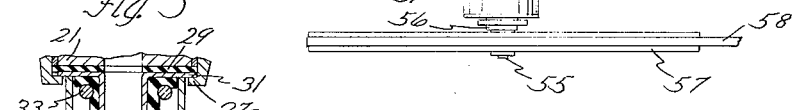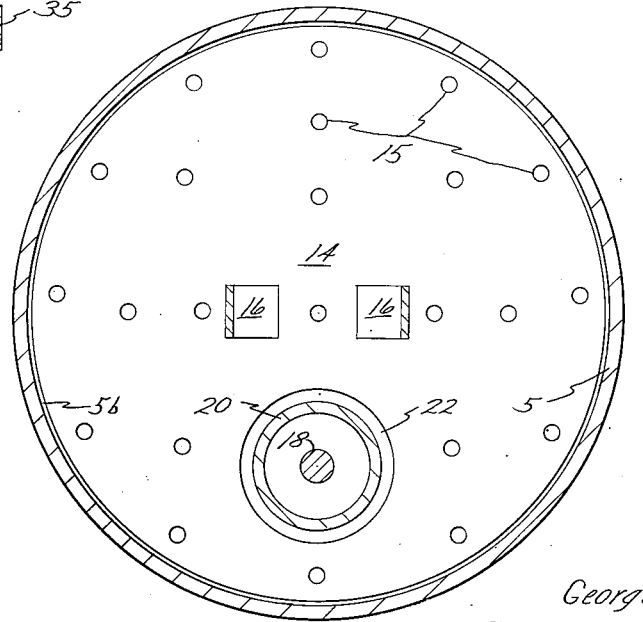

United States Patent Office 2,762,653
Patented Sept. 11, 1956

2,762,653

AGITATING AND SPRAY DEVICE

George Sinclair, Palouse, Wash.

Application August 25, 1955, Serial No. 530,560

5 Claims. (Cl. 299—98)

My invention relates to an improved agitating and spraying device. For certain purposes it is desirable to have a spraying device that will spray small amounts of a liquid having a large amount of finely divided solids suspended therein without having the solids settle out or plug the spraying equipment. An example of such need is found in the spraying of fields of wheat, barley, etc., to destroy undesirable weeds. Selective weed killers such as the well known 2,4-D are now commonly used by farmers. In applying these sprays it is a problem to follow the line to which the spray has been applied in the previous crossing of a field. The problem is overcome if one can provide markers on the field at frequent intervals to show where the spray extends to.

My invention is directed to a means to mix and deliver a low cost, easily visible marking material on the field from the spraying vehicle to mark the line to which the spray extends. An example of a highly visible marking material which is not particularly harmful to the crop is an aluminum paint. Such materials, however, need to be agitated continuously to keep the solids in suspension. When allowed to set they are difficult to clean out of valves, etc.

It is the purpose of my invention to provide an improved device for agitating and spraying a marking material of the character above described which will keep the material well mixed and will avoid to a substantial degree, the fouling of the controlling valves used to limit the flow of the mixture.

The nature and advantages of my invention will appear more fully from the following description and the accompanying drawings illustrating a preferred form of the invention. The drawings and description are illustrative only and are not intended to limit the scope of my invention except insofar as it is limited by the claims.

In the drawings:

Figure 1 is a sectional view through the agitating and spraying device showing it as adapted to be driven by suitable gearing from any power source on the spraying vehicle;

Figure 2 is a fragmentary sectional view on an enlarged scale taken on the line 2—2 of Figure 1;

Figure 3 is a top plan view of the device;

Figure 4 is an enlarged sectional view on the line 4—4 of Figure 1;

Figure 5 is an enlarged fragmentary sectional view of the discharge control valve used in the device.

Figure 6 is an enlarged sectional view through the sprayer nozzle; and

Figure 7 is a sectional view through a modified sprayer nozzle used when a hose is employed between the discharge control valve and the nozzle.

My agitating and spraying device includes a tank 5 for containing a supply of marking material. The tank 5 has a top flange 5a to which a cover 6 is mounted by bolts 7. The cover 6 carries most of the operating parts and is therefore made of relatively heavy metal plate. The cover 6 has a filling opening 8 that is normally closed by a cap 9. The cap 9 is locked in place by a lock bar 11 on the cap engaging lugs 11 and 12 on the cover 6. A chain 13 secures the cap 9 against loss.

The agitating part of the device comprises a reticulate plate like member 14. In the drawings, this member 14 is shown as a plate with a multiplicity of apertures 15 through it. The member 14 in its lowermost position rests flat upon the bottom 5b of the tank 5. This plate member 14 has a support 16 secured to it and extending upwardly to receive a lift member 17 which is a rod that extends through an aperture 16a in the support 16 and is provided with a head 17a in the form of a nut threaded on the lower end of the rod 17.

According to my invention the material is agitated in the tank 5 to keep the pigment or solids of the marking material in suspension by lifting the reticulate plate member 14 by force, then letting it settle of its own weight to the bottom of the tank. I have found this action to be especially effective in keeping the solids in the marking material in suspension. The member 14 covers substantially the entire bottom surface of the tank. When it is lifted from the bottom it causes violent action of the fluid beneath it to keep the solids from sticking to the bottom. The free settling of the member 14 causes a more gentle agitation of the suspended solids.

The marking fluid is discharged from the tank 5 through the bottom by a piston 18 working in a passageway 19 in a sleeve 20. The passageway 19 is formed in a cylinder 21 that is secured in the lower portion of the sleeve 20.

The sleeve 20 extends through the bottom of the tank 5. A resilient grommet 22 seals the tank around the sleeve 20. The sleeve 20 and its cylinder 21 are provided with apertures 23 and 24 at the bottom of the tank 5 for letting the marking fluid into the passageway 19. A coupling member 25 is mounted on the sleeve 20 beneath the tank 5. The coupling member 25 has a nut 26 threaded on its upper end to engage and compress the grommet 22. The coupling member 25 also has a nut 27 at its lower end provided with an inturned flange 27a to secure a valve unit 28 against the lower end of the sleeve 20. A gasket 29 is interposed between the valve unit 28 and the lower end of the sleeve 20 and the cylinder 21.

The valve unit 28 is shown on an enlarged scale in Figure 5. It comprises a cup portion 30 with a flange 31 at the upper open end engaged by the flange 27a. Around the cup 30, I place a sleeve 32 of a suitable resilient composition capable of resisting chemical attack by the marking material. Certain synthetic rubber compositions are commercially available that will serve the purpose. Neoprene rubber and even natural rubber may be used. The sleeve 32 is held in place by a metal ring 33 that is forced over the sleeve 32 and the cup 30. The cup 30 has apertures 34 that are covered by the sleeve 32. Normally the sleeve 32 lies flat against the cup 32 to seal the openings 34. However, when pressure of the marking fluid in the cup is raised by the piston 18 descending in the cylinder 19, the sleeve 32 is expanded as shown in Figure 5, to permit the fluid to discharge into a spray nozzle 35 that is secured on the outer shell 28a of the valve unit 28.

The sleeve 20 extends to the top cover 6 and has a flange 20a resting on the cover. Apertures 36 are provided in the sleeve 20 above the cylinder 21. The piston 18 is loosely secured to the lower end of an operating stem 37 by a head 38 and a mounting disc 39. The disc 39 also serves as a lower stop for a coiled spring 40. The sleeve 20 has a bushing 41 secured in its upper end to form an upper stop for the spring 40. The spring 40 is compressed by lifting the stem 37 and furnishes the motive force to drive the piston 18 downwardly in the passageway 19 at a rapid rate to expel a quantity of the marking fluid through the discharge control valve 28.

The stem 37 and the lifting member 17 are connected together at the top by a bar 42. The bar 42 is fixed to an operating arm 43. The stem 37 has a reduced portion 44 extending through the arm 43 and secured by a nut 45. A nut 46 on the member 17 limits its downward movement relative to the bar 42. When the stem 37 is forced down by the spring 40, the bar 42 strikes a resilient rubber washer 47 that rests on the cover 6. The nut 46 can be adjusted on the rod member 17 so that the agitator 14 will touch the bottom of the tank 5 when the bar 42 is in lowered position.

It is evident that any suitable lifting means can be employed to lift the operating arm 43 for compressing the spring 40 and lifting the agitator 14. As shown, I have provided a cam 48 engaging a cam follower 49 on the lower end of the L-shaped arm 43. The cam 48 is fixed on a shaft 50 that is journalled in a bearing 51 that is mounted on a downturned portion 6a of the cover 6. A roller 52 on the cover 6 is used to guide the arm 43 and oppose the lateral thrust of the cam 48. The shaft 50 has a gear 53 fixed thereon. This gear 53 is driven by a pinion 54 on a shaft 55. The shaft 55 is journalled in a bearing 56 on the portion 6a and carries a pulley 57 than can be driven by a belt 58. As illustrated in Figure 2, the cam 4 is so shaped as to lift the operating arm 43 and then release it so the spring 40 may expand and force the stem 37 downward. Any other suitable power mechanism may be used to lift and release the stem 37.

In some cases it may be desirable to use a hose from the member 28a to a nozzle remote from the tank 5. In such a case it is necessary to provide some means at the nozzle to avoid leakage of the volume of marking fluid in the hose. In Figure 7 of the drawings, I show an example of a nozzle that provides for this condition. The nozzle body 60 carries a resilient downwardly biased diaphragm 61 which has a plate 62 closing the nozzle outlets 63. A cover 64 over the diaphragm 61 has a small opening 65 and acts as a dashpot to prevent too sudden movement of the diaphragm 61 in either direction. A hose 66 is connected to an inlet 67 to the space in the body 60 beneath the diaphragm 61.

When there is no pressure in the hose 66, the diaphragm 61 holds the plate 62 in position to close the outlets 63. When pressure increases in the hose it finally forces the diaphragm 61 upwardly to open the outlets 63. When the pressure in the hose drops again the diaphragm 61 will move down slowly to close the outlets 63.

With my agitating and spraying mechanism just described the marking fluid is readily handled. The agitator 14 tends to keep the solids in suspension. The piston 18 need not fit tightly in the passageway 19 because its rapid downward movement will create ample pressure in the cup 30 to expand the sleeve 32 and discharge the fluid. The sleeve 32 is particularly effective. It cannot be made inoperative by bits of hardened solids in the marking fluid. It will allow them to pass, yet it will close when the pressure is off. All of the parts are readily accessible for cleaning.

Having thus described my invention, I claim:

1. In an agitating and spraying device adapted to deliver intermittently a quantity of a marker fluid, a supply tank, a vertically reciprocating stem in said tank having a piston on its lower end, means operable intermittently to lift the stem and release it, a spring around the stem under compression between the top of the tank and the piston, operable to force the piston down when the stem is released by said means, a sleeve in the tank having a passage into which said piston extends, the sleeve having openings therethrough to the tank at the bottom of the tank, a cup at the bottom of the sleeve, having side apertures and a resilient tubular sleeve around the cup covering said apertures, said resilient sleeve being expandable by pressure of liquid through the side apertures of said cup to permit liquid to flow out of the cup through said resilient sleeve.

2. In an agitating and spraying device adapted to deliver intermittently a quantity of a marker fluid, a supply tank, a vertically reciprocating stem in said tank having a piston on its lower end, means operable intermittently to lift the stem and release it, a spring connected to the stem and into the tank, operable to force the piston down when the stem is released by said means, a sleeve in the tank, the sleeve having a passageway therein opening into the tank and extending through the tank bottom, and said piston operating in said passageway, a valve unit at the bottom of said passageway secured to the sleeve, operable to open under pressure in said passageway, a reticulated plate covering the bottom of the tank, means connected to the stem operable to lift the plate with the stem, the plate being supported by said means for free movement upward with respect to the stem.

3. In an agitating and spraying device adapted to deliver intermittently a quantity of a marker fluid, a supply tank, a vertically reciprocating stem in said tank having a piston on its lower end, means operable intermittently to lift the stem and release it, a spring around the stem under compression between the top of the tank and the stem, operable to force the stem down when the stem is released by said means, an agitator plate in said tank having a portion apertured to receive the stem, said plate substantially covering the tank bottom and having a multiplicity of apertures therein, the plate being connected to the stem for rising movement with the stem when the stem is lifted and being free to move vertically with respect to the stem when the stem is moved down by said spring, a sleeve in the tank having a cylinder into which said piston extends, the sleeve having an opening therein leading from the tank to the cylinder below the uppermost limit of movement of the piston, a check valve on the sleeve opposing upward flow of fluid through the cylinder, and a discharge nozzle connected to said sleeve.

4. In an agitating and spraying device adapted to deliver intermittently a quantity of a marker fluid, a supply tank, a vertically reciprocating stem in said tank having a piston on its lower end, means operable intermittently to lift the stem and release it, a spring connected to the stem and into the tank, operable to force the piston down when the stem is released by said means, a sleeve in the tank, the sleeve having a passageway therein opening into the tank and extending through the tank bottom, and said piston operating in said passageway, a valve unit at the bottom of said passageway secured to the sleeve, operable to open under pressure in said passageway, a reticulated plate covering the bottom of the tank, means connected to the stem operable to lift the plate with the stem, the plate being supported by said means for free movement upward with respect to the stem, the valve unit comprising a cup having side apertures and a resilient sleeve around the cup covering said apertures, said resilient sleeve being expandable by pressure of liquid through the side apertures of said cup to permit liquid to flow out of the cup through said resilient sleeve, and a spray nozzle carried by said valve unit around the cup and resilient sleeve.

5. In an agitating and spraying device adapted to deliver intermittently a quantity of a marker fluid, a supply tank, a vertically reciprocating stem in said tank having a piston on its lower end, means operable intermittently to lift the stem and release it, a spring connected to the stem and into the tank, operable to force the piston down when the stem is released by said means, a sleeve in the tank, the sleeve having a passageway therein opening into the tank and extending through the tank bottom, and said piston operating in said passageway, a valve unit at the bottom of said passageway secured to the sleeve, operable to open under pressure in said passageway, a reticulated plate covering the bottom of the tank, means connected to the stem operable to lift the plate with the stem, the plate being supported by said means for free movement upward with respect to the stem, a spray nozzle, a hose connected thereto and receiving liquid from the resilient sleeve, said nozzle having outlets and a diaphragm therein carrying a closure for the nozzle outlets normally biased into outlet closing position, the hose opening into the nozzle between the diaphragm and the outlets, and a cover over the diaphragm having an air leak aperture therein acting to retard changes in position of the diaphragm by changes in pressure of fluid in the hose.

References Cited in the file of this patent

UNITED STATES PATENTS

| | | |
|---|---|---|
| 1,039,591 | Prideaux | Sept. 24, 1912 |
| 2,715,980 | Frick | Aug. 23, 1955 |

FOREIGN PATENTS

| | | |
|---|---|---|
| 808,183 | France | Nov. 6, 1936 |